(No Model.) 4 Sheets—Sheet 1.

D. M. PFAUTZ.
TRICYCLE.

No. 573,285. Patented Dec. 15, 1896.

Witnesses
E. J. Nottingham
G. F. Downing

Inventor
D. M. Pfautz
By H. A. Seymour
Attorney (No Model.) 4 Sheets—Sheet 2.

D. M. PFAUTZ.
TRICYCLE.

No. 573,285. Patented Dec. 15, 1896.

Witnesses
O. J. Nottingham
G. F. Downing

Inventor
D. M. Pfautz
By H. A. Seymour
Attorney (No Model.) 4 Sheets—Sheet 3.

D. M. PFAUTZ.
TRICYCLE.

No. 573,285. Patented Dec. 15, 1896.

Witnesses
E. J. Nottingham
G. F. Downing

Inventor
D. M. Pfautz
By H. A. Seymour
Attorney (No Model.) 4 Sheets—Sheet 4.

D. M. PFAUTZ.
TRICYCLE.

No. 573,285. Patented Dec. 15, 1896.

Witnesses
O. D. Nottingham
G. F. Downing

Inventor
D. M. Pfautz
By H. A. Seymour
Attorney

United States Patent Office.

DANIEL M. PFAUTZ, OF PHILADELPHIA, PENNSYLVANIA, ASSIGNOR TO THE CARRIAGE CYCLE COMPANY, OF NEW JERSEY.

TRICYCLE.

SPECIFICATION forming part of Letters Patent No. 573,285, dated December 15, 1896.

Application filed July 26, 1895. Serial No. 557,227. (No model.)

*To all whom it may concern:*

Be it known that I, DANIEL M. PFAUTZ, a citizen of the United States, residing at Philadelphia, in the county of Philadelphia and State of Pennsylvania, have invented certain new and useful Improvements in Tricycles; and I do hereby declare the following to be a full, clear, and exact description of the invention, such as will enable others skilled in the art to which it appertains to make and use the same.

My invention relates to an improvement in cycles, and more particularly to an improvement in tricycles; and it consists in certain novel features of construction and combinations of parts which will be hereinafter described, and pointed out in the claims.

Figure 1:
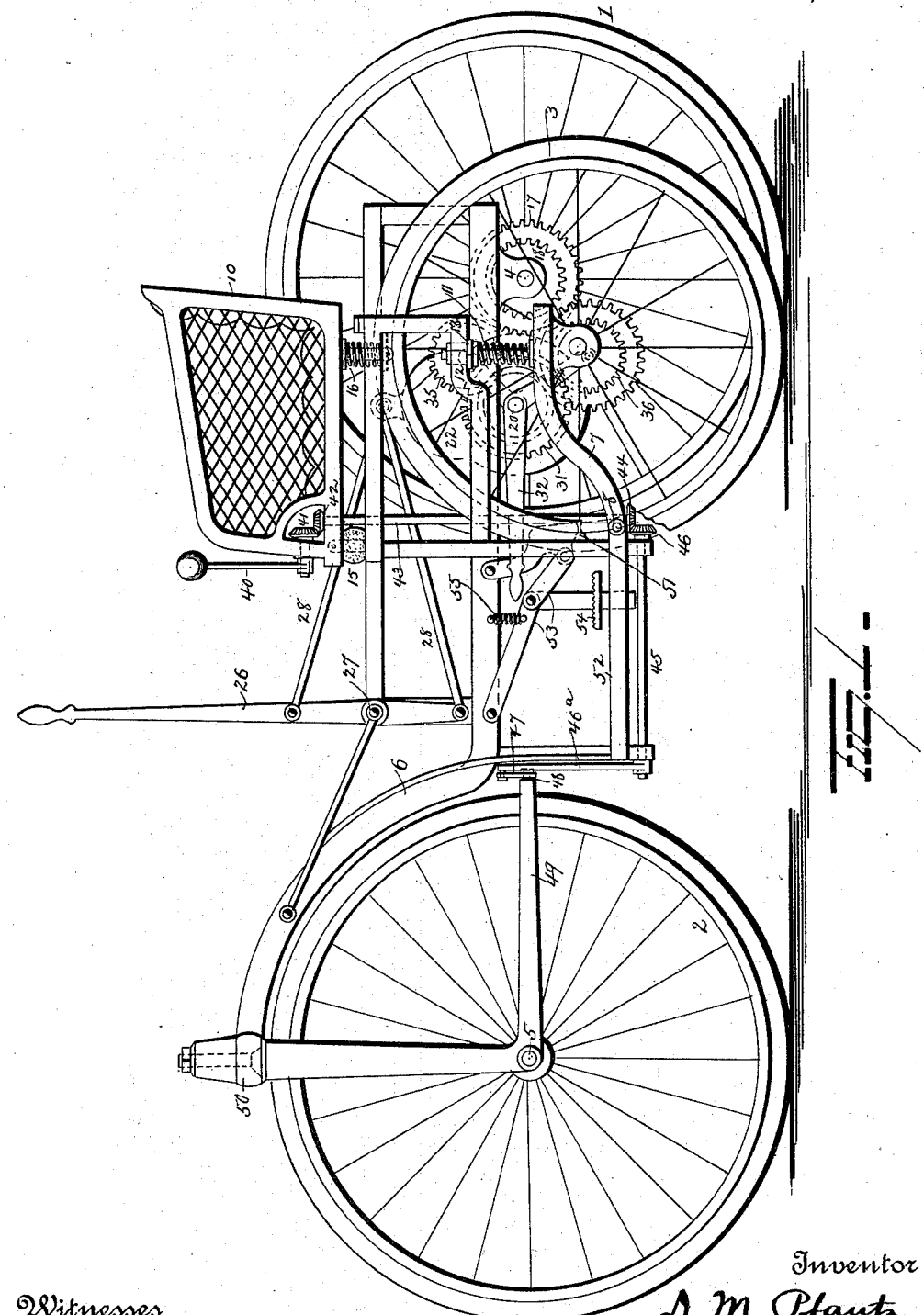
Figure 2:
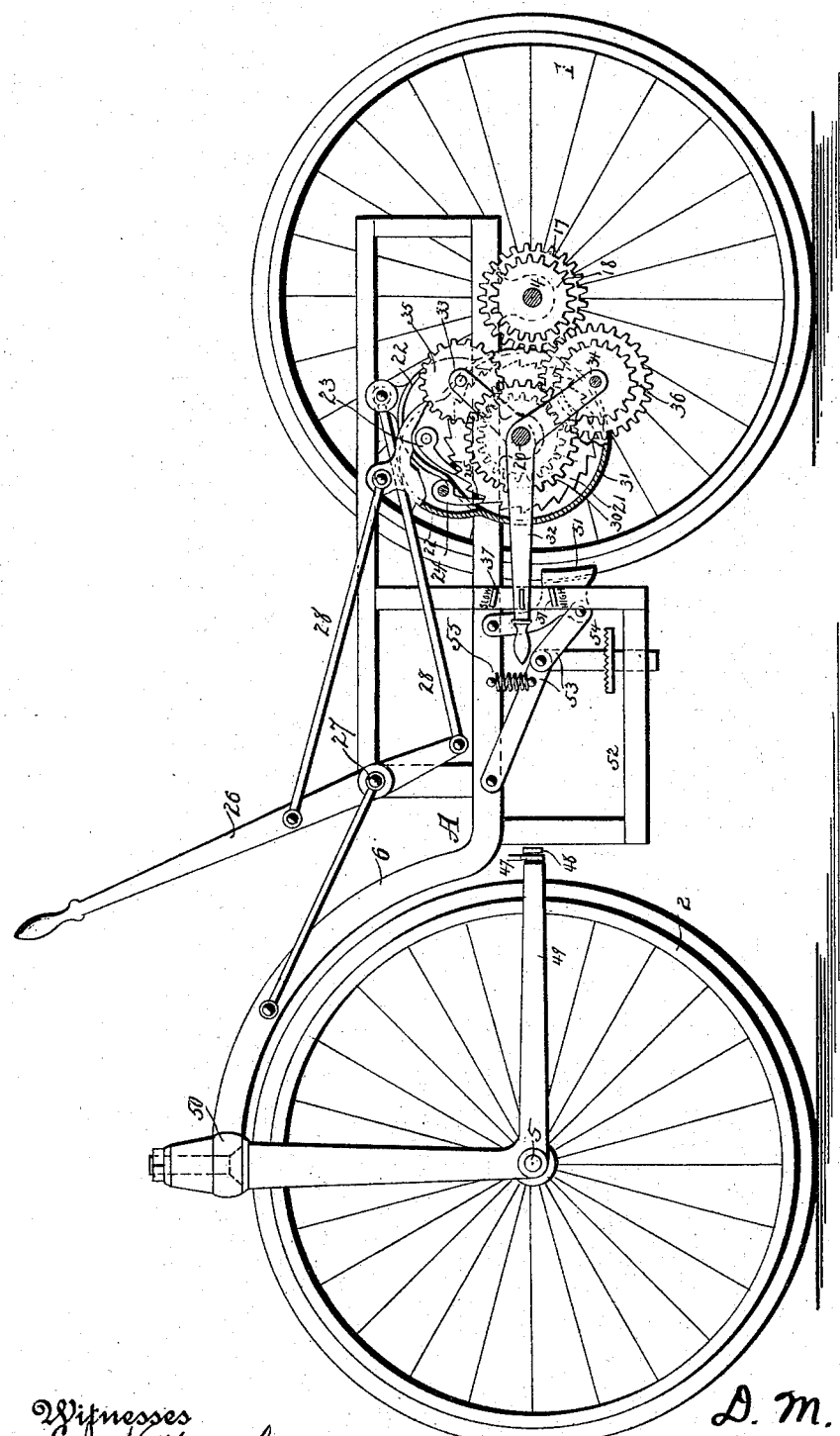
Figure 3:
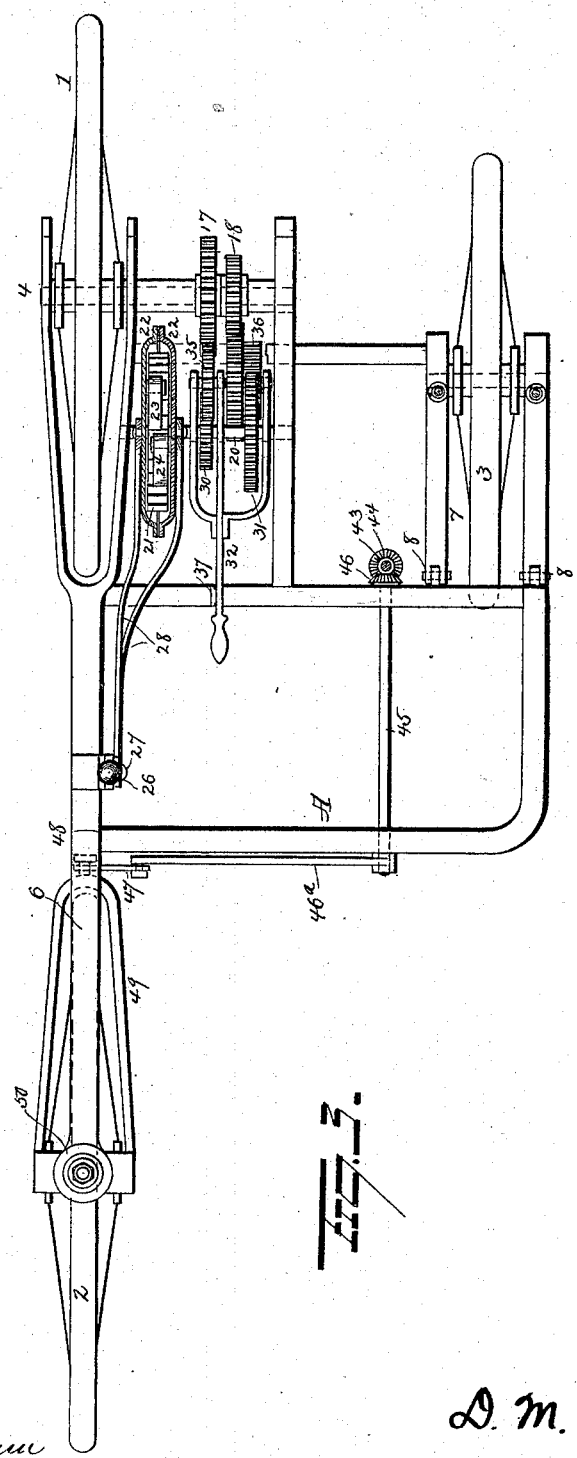
Figure 4:
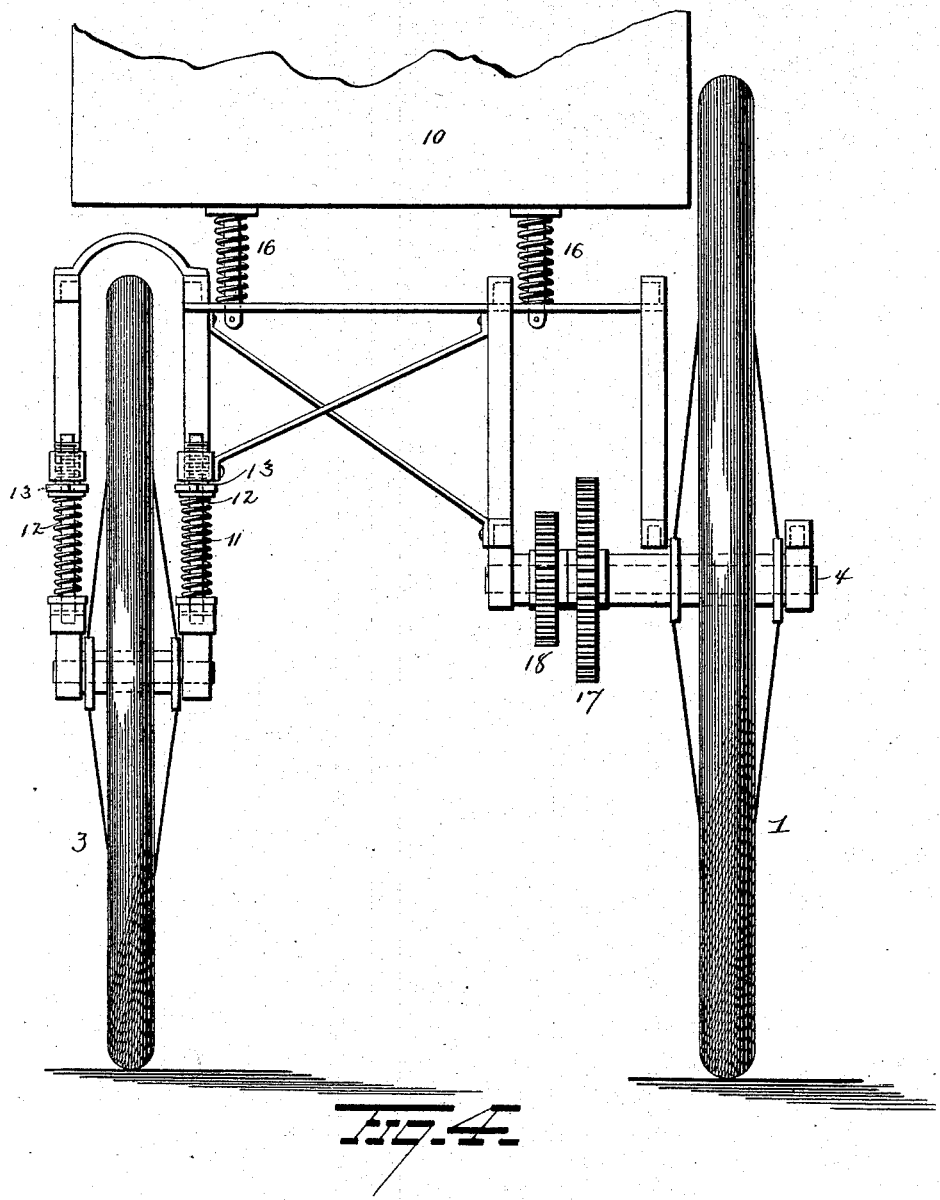

In the accompanying drawings, Figure 1 is a view in side elevation. Fig. 2 is a vertical longitudinal sectional view. Fig. 3 is a plan view, and Fig. 4 is a partial rear elevation.

A represents the frame of the machine; 1, the propelling-wheel; 2, the steering-wheel, and 3 the carrying-wheel. Wheels 1 and 2 are in alinement with each other after the manner of a bicycle, they turning on axles 4 and 5, respectively, in the usual manner. From the backbone 6 of the machine a portion of the frame extends laterally, and to this lateral portion the carrying-wheel frame 7 is hinged, as at 8 8. A portion of the frame A extends upward over this hinged carrying-wheel frame, and on this frame the seat 10 is supported. Interposed between the hinged frame and the seat-frame are stiff spiral springs 11 11, they being mounted on bolts 12 12, and the nuts 13 13 on these bolts are turned to regulate the tension of the spiral springs. This arrangement gives a spring action to the carrying-wheel and relieves the rider of shocks and jars which would otherwise result from riding over rough ground. The seat itself may also be cushioned by resting upon the rubber balls 15 15 at the forward end and upon the spiral springs 16 16 at the rear end. This arrangement may obviously be varied, as it is by no means necessary that rubber balls should be employed in one instance and spiral springs in the other. They might be interchanged, or either could be used alone.

Returning now to the wheels and taking them in the order first mentioned for convenience, and first the propelling-wheel 1, this wheel is revolubly supported in the rear fork of the main frame and its axle 4 extends out laterally, as shown in Fig. 3, and on this lateral extension are keyed a large gear-wheel 17 and a small gear-wheel 18, for slow and high speed purposes, respectively. A shaft 20 is journaled in the frame of the machine forward of the propelling-wheel axle, and it extends parallel therewith. On this shaft is secured a ratchet-toothed wheel 21, and loosely mounted on the shaft is a casing made in two half shells or sections 22 22, which when together form an inclosure, and within this inclosure two pawls 23 and 24 are located, one being pivoted to each half shell or section and their free ends extending forward and adapted to engage the teeth of the ratchet-toothed wheel. Rubbers 25 25 are placed on the inner faces of these pawls to muffle the sound of the pawls in passing from one tooth to another as they are carried back to take a new hold.

A hand-lever 26 is fulcrumed at some convenient point on the frame of the machine, say at 27, a short distance in front of the rider. From this lever 26 a pair of connecting-rods 28 28 extend from points above and below the fulcrum of the lever to the half shells or sections 22 22, one being pivotally connected to each of them. From this construction it will be seen that as the hand-lever is vibrated back and forth the pawls 23 and 24 will alternately turn the ratchet-toothed wheel forward, and as one is moving the wheel forward the other will be moving back to take a new hold, so that the forward movement of the ratchet-toothed wheel is rapid and the application of power thereto is continuous in the propulsion of the machine, and if the rider ceases to move this hand-lever it remains stationary and the ratchet-toothed wheel simply turns beneath the pawls, forcing them out of the way as the teeth turn forward beneath them until the machine stops.

As has been mentioned incidentally, the gearing is a two-speed gearing. For this purpose two gear-wheels, one small wheel 30 and one large wheel 31, are secured on shaft 20. A hand-lever 32 is loosely mounted on this shaft also, and two arms 33 and 34 extend rearward from the fulcrum of the lever, the former upward and the latter downward. Journaled on the upper arm is the pinion 35 and on the lower one pinion 36. The latter is a double gear to correspond in position with the gears 18 and 31. A toothed segment 37 is formed on the frame of the machine and this hand-lever 32 is held in one of three positions by the teeth of this segment. In Figs. 1 and 2 it is in a horizontal position, and both the pinions connected therewith are removed from and out of engagement with gears 17 and 18. This is the position of parts when it is desired to run the machine by momentum or "coast." When the slow speed is desired, the lever is raised to the upper notch, and if a high speed is wanted the lever is lowered in the bottom notch. When the lever is in the elevated position, pinion 35 is in engagement with wheels 30 and 17, and when depressed wheel 36 is thrown into engagement with wheels 31 and 18.

The steering is accomplished by the following mechanism: A hand-lever 40 is pivotally supported at the forward edge of the seat, it being adapted to be swung laterally to the right or left. On its axis is secured a bevel-gear 41. A vertical rock-shaft 43 is furnished at its upper end with a bevel-pinion 42, the teeth of which mesh with the teeth of pinion 41. This shaft is provided on its lower end with a second bevel-pinion, 44. A horizontal rock-shaft 45 is likewise provided with a bevel-pinion 46, which engages pinion 44. This rock-shaft 45 has an upwardly-extending crank 46ª secured thereto, and from the upper end of this crank 46ª a connecting-rod 47 extends to the wrist 48 on the extreme rear end of the fork 49, which extends rearward from the steering-wheel 2. In this manner, through this chain of gearing and mechanism, the steering-wheel is turned in its bearing 50 when it is desired to turn the machine.

In addition to the parts described a brake is provided. While it is evident that different forms of brakes might be adopted, yet I have devised the following: A brake-shoe 51 is pivoted at its upper end to the frame of the machine, its lower end preferably depending in front of the propelling-wheel 1 just above platform 52. Connected with the free end of this brake-shoe is the toggle-joint 53, and the foot-treadle 54 depends from this toggle, it being pivotally connected therewith. A spring 55 returns this toggle and brake-shoe to their normal positions.

From the foregoing description it is seen that the propelling is done by one hand and the steering by the other, and that one foot is used for applying the brake when necessary, the other resting on the platform 52 constantly, and by setting lever 32 the gearing is set for coasting or for low speed, as desired.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. The combination with the main frame, main wheel, and a laterally-extending seat-frame, of a hinged frame beneath this lateral frame, a wheel connected therewith, and a spring interposed between the hinged frame and seat-frame, substantially as set forth.

2. In a cycle, the combination with a frame, and a propelling-wheel, of a ratchet-toothed wheel, a pair of half shells or sections, pawls pivoted thereto and adapted to engage the teeth of this wheel, an operating-lever, and rods extending from this lever at points on each side of its fulcrum, to the half shells or sections for alternately operating the pawls whereby to impart a continuous motion to the ratchet-toothed wheel, substantially as set forth.

3. In a cycle, the combination of a frame, a propelling-wheel with extended hub, a driving-shaft having a ratchet-toothed wheel thereon, half shells or sections carrying pawls for operating this ratchet-toothed wheel, connecting-rods for operating said sections carrying the pawls, a large and small gear-wheel on the extended hub, and on the driving-shaft, and a forked lever carrying two pinions for communicating motion of different speeds from the driving-shaft to the extending hub and for disconnecting the gearing, substantially as set forth.

4. In a cycle, the combination with a frame, a propelling-wheel, an axle, a drive-shaft having a ratchet-toothed wheel thereon, half shells or sections carrying pawls for operating this ratchet-toothed wheel, levers for operating said sections carrying the pawls, a large and small gear-wheel on the axle and on the drive-shaft, and a lever carrying two pinions for communicating motion of different speeds from the drive-shaft to the axle, and for disconnecting the gearing, substantially as set forth.

In testimony whereof I have signed this specification in the presence of two subscribing witnesses.

DANIEL M. PFAUTZ.

Witnesses:
 W. S. FURST,
 SAML. M. BIRD.